(12) United States Patent
Sakata

(10) Patent No.: US 12,190,658 B2
(45) Date of Patent: Jan. 7, 2025

(54) FAULT DIAGNOSIS DEVICE, FAULT DIAGNOSIS SYSTEM, FAULT DIAGNOSIS METHOD, AND FAULT DIAGNOSIS PROGRAM

(71) Applicant: NEC Corporation, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 17/781,121

(22) PCT Filed: Oct. 7, 2020

(86) PCT No.: PCT/JP2020/037951
§ 371 (c)(1),
(2) Date: May 31, 2022

(87) PCT Pub. No.: WO2021/111726
PCT Pub. Date: Jun. 10, 2021

(65) Prior Publication Data
US 2022/0406103 A1    Dec. 22, 2022

(30) Foreign Application Priority Data
Dec. 5, 2019   (JP) .................. 2019-220332

(51) Int. Cl.
  *G07C 5/08*    (2006.01)
(52) U.S. Cl.
  CPC ......... *G07C 5/0816* (2013.01); *G07C 5/0808* (2013.01); *G07C 5/085* (2013.01)

(58) Field of Classification Search
  CPC .... G07C 5/0816; G07C 5/0808; G07C 5/085; G07C 5/0841; G07C 2205/02; B60R 16/02; G01M 17/007; G05B 23/02
  See application file for complete search history.

(56) References Cited

U.S. PATENT DOCUMENTS 8,621,286 B2 * 12/2013 Ozawa ................ G06F 11/0724
                                                                 714/48

FOREIGN PATENT DOCUMENTS

| JP | H07-172251 A | 7/1995 |
| JP | 2004-268633 A | 9/2004 |
| JP | 2004-272375 A | 9/2004 |
| JP | 2006-053016 A | 2/2006 |
| JP | 2007-161044 A | 6/2007 |
| JP | 2009-063455 A | 3/2009 |
| JP | 2015-176285 A | 10/2015 |

(Continued)

OTHER PUBLICATIONS

International Search Report for PCT Application No. PCT/JP2020/037951, mailed on Dec. 15, 2020.

(Continued)

*Primary Examiner* — Michael V Kerrigan
(74) *Attorney, Agent, or Firm* — Sughrue Mion, PLLC

(57) ABSTRACT

A fault diagnosis device 80 includes an input unit 81 and a generation unit 82. The input unit 81 receives input of fault data obtained from a vehicle when a fault of the vehicle occurs and observation data observed in time series by each device of the vehicle until immediately before the fault occurs. The generation unit 82 generates a feature master that associates a content of the fault indicated by the fault data with features extracted from the corresponding observation data.

13 Claims, 6 Drawing Sheets

(56) References Cited

FOREIGN PATENT DOCUMENTS

| JP | 2018-159991 A | 10/2018 |
| JP | 2019-067069 A | 4/2019 |
| JP | 2019-159730 A | 9/2019 |

OTHER PUBLICATIONS

Dongjin Song, Ning Xia, Wei Cheng, Haifeng Chen, Dacheng Tao, "Deep r-th Root of Rank Supervised Joint Binary Embedding for Multivariate Time Series Retrieval", KDD 2018, Proceedings of the 24th ACM SIGKDD International Conference on Knowledge Discovery & Data Mining, pp. 2229-2238, Aug. 19-23, 2018, London, UK.

JP Office Action for JP Application No. 2021-562477, mailed on Aug. 27, 2024 with English Translation.

\* cited by examiner

FAULT DIAGNOSIS DEVICE, FAULT DIAGNOSIS SYSTEM, FAULT DIAGNOSIS METHOD, AND FAULT DIAGNOSIS PROGRAM

This application is a National Stage Entry of PCT/JP2020/037951 filed on Oct. 7, 2020, which claims priority from Japanese Patent Application 2019-220332 filed on Dec. 5, 2019, the contents of all of which are incorporated herein by reference, in their entirety.

TECHNICAL FIELD

The present invention relates to a fault diagnosis device, a fault diagnosis system, a fault diagnosis method and a fault diagnosis program for diagnosing vehicle faults.

BACKGROUND ART

Currently, general vehicles are equipped with a system to grasp the content of faults that have occurred. Specifically, when a fault occurs in a vehicle, a DTC (Diagnostic Trouble Code) is output, and by reading the output DTC, it is possible to investigate the factors (fault location and fault content) that caused the fault of the vehicle.

On the other hand, it is preferable to detect a sign of fault in advance and repair it before the vehicle breaks down, instead of responding after the vehicle breaks down. In this regard, for example, Patent Literature 1 describes a vehicle fault diagnosis device that predicts when a vehicle will break down. The device described in Patent Literature 1 maintains a fault pattern that represents the process until vehicle control system faults in time series, and predicts the fault timing of the vehicle control system by comparing the fault pattern with the history of learning values actually used in the vehicle control system of the vehicle in the past.

Non-patent literature 1 describes a method for extracting features from time series data.

CITATION LIST

Patent Literature

PTL 1: Japanese Patent Laid-Open No. 2006-53016

Non-Patent Literature

NPL 1: Dongjin Song, Ning Xia, Wei Cheng, Haifeng Chen, Dacheng Tao, "Deep r-th Root Rank Supervised Joint Binary Embedding for Multivariate Time Series Retrieval", KDD '18 Proceedings of the 24th ACM SIGKDD International Conference on Knowledge Discovery & Data Mining, pp. 2229-2238, August, 2018.

SUMMARY OF INVENTION

Technical Problem

Noise and odor in a vehicle that can be sensed by humans can be considered a sign of a fault. Therefore, it is possible to detect signs of some kind of fault by installing sensors in vehicles that can detect such unusual noises and odors. However, not all vehicles are necessarily equipped with sensors to detect such events in general, and it is not realistic to install all the sensors that are assumed to detect faults in a vehicle. Therefore, it is preferable to be able to generate information for diagnosing vehicle faults from information that can be collected in a general vehicle without installing special sensors.

The vehicle fault diagnostic device described in Patent Literature 1 generates a fault pattern based on the relationship with the elapsed years and predicts faults based on the fault pattern. However, even if the device described in Patent Literature 1 can predict faults due to age-related deterioration, etc., it cannot detect the signs of faults that may occur in daily life.

Therefore, it is an exemplary object of the present invention is to provide a fault diagnosis device, a fault diagnosis system, a fault diagnosis method, and a fault diagnosis program capable of generating information for diagnosing a sign of a fault from collected vehicle fault data.

Solution to Problem

A fault diagnosis device according to the exemplary aspect of the present invention includes an input unit for receiving input of fault data obtained from a vehicle when a fault of the vehicle occurs and observation data observed in time series by each device of the vehicle until immediately before the fault occurs and a generation unit for generating a feature master that associates a content of the fault indicated by the fault data with features extracted from the corresponding observation data.

A fault diagnosis system according to the exemplary aspect of the present invention includes the above-mentioned fault diagnostic device, and a target vehicle which receives information from the fault diagnostic device, wherein the fault diagnostic device includes a transmitting unit for transmitting the generated feature master to the target vehicle, and wherein the target vehicle includes a control unit for detecting a sign of fault indicated by the corresponding fault data by determining the similarity between the features of the observation data included in the received feature master and the observation data obtained at any time in the own target vehicle.

A fault diagnosis method according to the exemplary aspect of the present invention includes wherein one or more computers receive input of fault data obtained from a vehicle when a fault of the vehicle occurs and observation data observed in time series by each device of the vehicle until immediately before the fault occurs, and wherein the one or more computers generate a feature master that associates a content of the fault indicated by the fault data with features extracted from the corresponding observation data.

A fault diagnosis program according to the exemplary aspect of the present invention causes a computer to execute, an input process of receiving input of fault data obtained from a vehicle when a fault of the vehicle occurs and observation data observed in time series by each device of the vehicle until immediately before the fault occurs, and a generation process of generating a feature master that associates a content of the fault indicated by the fault data with features extracted from the corresponding observation data.

Advantageous Effects of Invention

According to the exemplary aspect of the present invention, it is possible to generate information for diagnosing a sign of a fault from collected vehicle fault data.

DESCRIPTION OF EMBODIMENTS

Hereinafter, exemplary embodiments of the present invention are described with reference to the drawings.

Exemplary Embodiment 1

Figure 1:
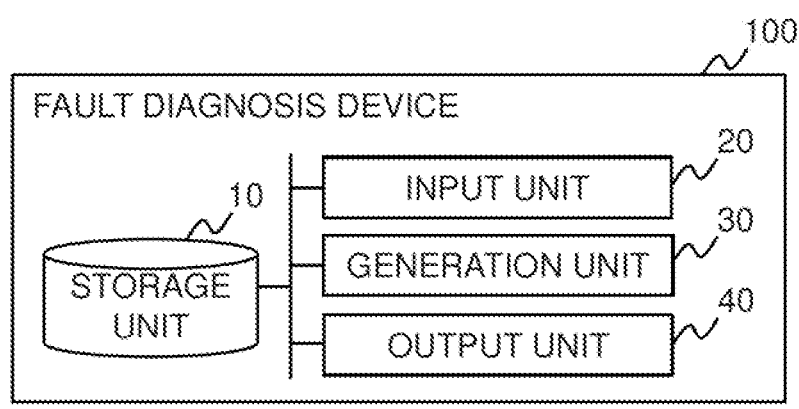
FIG. 1 It depicts a block diagram showing a configuration example of a first exemplary embodiment of a fault diagnosis device according to the exemplary aspect of the present invention.

FIG. 1 is a block diagram showing a configuration example of a first exemplary embodiment of a fault diagnosis device according to the exemplary aspect of the present invention. The fault diagnosis device 100 of this exemplary embodiment comprises a storage unit 10, an input unit 20, a generation unit 30, and an output unit 40.

The storage unit 10 stores various information necessary for the fault diagnosis device 100 to perform a process. The storage unit 10 may also store fault data and observation data received by the input unit 20, which will be described later. The storage unit 10 is realized by a magnetic disk or the like, for example.

The input unit 20 accepts input of fault data obtained from a vehicle when a fault of the vehicle occurs and observation data observed in time series by each device of the vehicle until immediately before the fault occurs. Examples of devices include an engine, a water temperature sensor, and a battery. General vehicles are equipped with a system to output a DTC, which is a code indicating the fault content. Therefore, the input unit 20 may receive input of a DTC as fault data.

CAN (Controller Area Network) is often used as a communication protocol for an electronic control unit (ECU) in an in-vehicle network. Therefore, the input unit 20 may receive input of communication data specified by a CAN protocol as observation data. In addition, the input unit 20 may also receive input of data obtained by OBD (On-board diagnostics) as observation data. Data obtained by OBD may include an engine RPM and speed, a battery status, a water temperature, etc.

The form of fault data and observation data is arbitrary, and the form of each data should be predetermined according to the information necessary for the generation unit 30 described later to perform a process.

The generation unit 30 generates a feature master that associates a content of the fault indicated by the fault data with features extracted from the corresponding observation data. In other words, for each fault that occurs, the generation unit 30 analyzes the features indicated by the observed data up to the most recent time of the fault. This is because it is considered that the data until immediately before the fault occurs includes features indicating a sign of the fault.

The feature master can be referred to as a pattern file because the feature master represents a pattern indicating a sign of the fault.

The method by which the generation unit 30 generates the feature master is arbitrary. For example, the generation unit 30 may generate a feature master by extracting a portion having common features from multiple observation data regarding the same fault content collected.

Considering that the feature master is used for comparison with the observation data obtained by the vehicle, it is preferable to be able to extract features of the observation data in a compact form. Therefore, the generation unit 30 may generate observation data of a partial time series by dividing the observation data of a time series into multiple segments, extract the features for each segment, and generate a feature master that includes those features.

For example, the generation unit 30 may perform a model-free analysis as described in non-patent literature 1 on the observation data obtained in a time series. Model-free analysis is a technique for matching the similarity between the present and the past for observation data such as sensor values that are obtained in a time series, and is a technique for determining when the present condition is similar to a past condition. In this exemplary embodiment, model-free analysis determines whether the collected past fault conditions are similar to the observed data that is currently obtained. Although model-free analysis is used here, other analysis method may be used as long as it is an analysis method that are capable of determining which of the past conditions the current observation data is similar to.

Specifically, the generation unit 30 may generate a feature extraction engine for the system by learning the observation data obtained in time series through deep learning. The generation unit 30 may then extract features from the observation data using the generated feature extraction engine and generate a feature master that associates the extracted features with a content of the fault indicated by the corresponding fault data.

The generation unit 30 may also generate feature masters for each type of vehicle (vehicle type). In this case, the generation unit 30 can group fault data and observation data for each vehicle of the same type and generate feature masters for the grouped fault data and observation data.

Depending on the quantity and quality of the fault data, it may not be possible to generate a sufficient feature master. Therefore, the generation unit 30 may determine whether the feature master includes a pattern that can predict a fault. If it is determined that the feature master does not include a pattern that can predict a fault, the generation unit 30 may decide to generate a feature master from further fault data and observation data. For example, if, by cross-validation or other means, the probability of a fault that can be detected based on features in the observation data corresponding to the fault data does not exceed a predetermined threshold value (for example, 80%), the generating unit 30 may determine that it does not include a pattern that can predict a fault.

Hereinafter, the operation of the generation unit 30 of this exemplary embodiment will be described with reference to a specific example. As described above, the generation unit 30 of this exemplary embodiment extracts features (relationships) of faults from multiple data (observation data), and derives features (feature masters) that show similar transitions from multiple data. For example, assume that a pattern of engine fault due to overheating (abnormal coolant temperature) was collected. Here, assumed that whether or not the observation data has changed in a pattern similar to a certain input data is compared with the feature master. As a result of this comparison, for example, it is output the contents that 60% is an abnormality of the fan, 20% is an abnormality of the engine speed, 10% is a cause caused by the temperature, and 10% is other.

Note that this is only an output of the possibility of the relationship (degree of match) with respect to the input data, and the result may not necessarily be correct. Even if the probability is the highest, it does not necessarily mean that it is the only cause. This is because a fan fault is usually the first suspected reason for an increase in coolant temperature.

Here, assumed that the data is concerned about the engine speed abnormality, which has the second highest probability. This is because it is possible that the engine may have overheated due to frictional heat from the engine cylinders. And the occurrence of an engine speed abnormality in such a feature increases the possibility that it can be said to be an overheat. Such a condition can be said to be a condition in which a sign has been found. When the generation unit 30 can say that it has found such a sign, it may determine that the feature master includes a pattern that can predict a fault.

On the other hand, as a result of comparison with the input data, assumed that 99% is a fan abnormality and 1% is other. In this case, since the pattern is already known, the generation unit 30 determines that the signs could not be detected and performs further a process using more data.

Note that if a feature master including such patterns is used, it is highly likely that the same pattern of abnormalities will not occur, since the signs can be detected before the actual fault occurs. However, for example, if the same abnormality appears in the engine speed, it is likely that a different pattern caused the engine speed abnormality. In this case, the generation unit 30 may perform further the generation process of a feature master.

The output unit 40 outputs the generated feature master. The output unit 40 may transmit the feature master to the vehicle.

The input unit 20, the generation unit 30, and the output unit 40 are realized by a processor (for example, CPU (Central Processing Unit), GPU (Graphics Processing Unit)) of a computer that operates according to a program (a fault diagnosis program). For example, a program may be stored in storage unit 10, and the processor may read the program and operate as the input unit 20, the generation unit 30, and the output unit 40 according to the program. In addition, the functions of the fault diagnostic device 100 may be provided in the form of SaaS (Software as a Service).

The input unit 20, the generation unit 30, and the output unit 40 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the fault diagnosis device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

Figure 2:
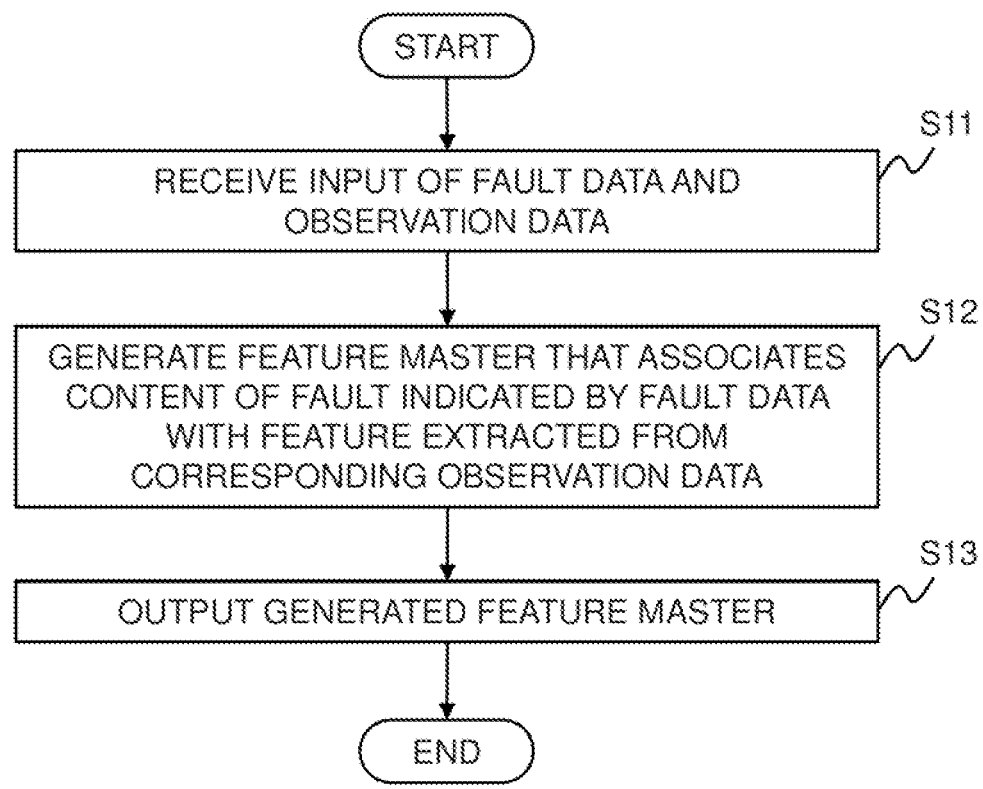
FIG. 2 It depicts a flowchart showing an operation example of a fault diagnosis device.

Next, the operation example of this exemplary embodiment will be described. FIG. 2 is a flowchart showing an operation example of the fault diagnosis device 100 of this exemplary embodiment.

The input unit 20 receives input of fault data and observation data (step S11). The generation unit 30 generates a feature master that associates a content of the fault indicated by the fault data with features extracted from the corresponding observation data (step S12). The output unit 40 outputs the generated feature master (step S13).

As described above, in this exemplary embodiment, the input unit 20 receives input of fault data and observation data, and the generation unit 30 generates a feature master that associates a content of the fault indicated by the fault data with features extracted from the corresponding observation data. Therefore, it is possible to generate information for diagnosing a sign of a fault from collected vehicle fault data.

In other words, the feature master generated in this exemplary embodiment includes the features of the observation data observed immediately before the fault in the vehicle in which the fault occurred. Therefore, by using this feature master, it is possible to diagnose a sign of fault, such as peculiar changes, for example.

Exemplary Embodiment 2

Next, a second exemplary embodiment of the present invention will be described. The second exemplary embodiment describes a method for detecting a sign of fault in a vehicle using the feature master generated in the first exemplary embodiment. This exemplary embodiment assumes an embodiment in which fault data and observation data are collected from a vehicle and feature masters generated from these data are distributed to vehicles.

Figure 3:
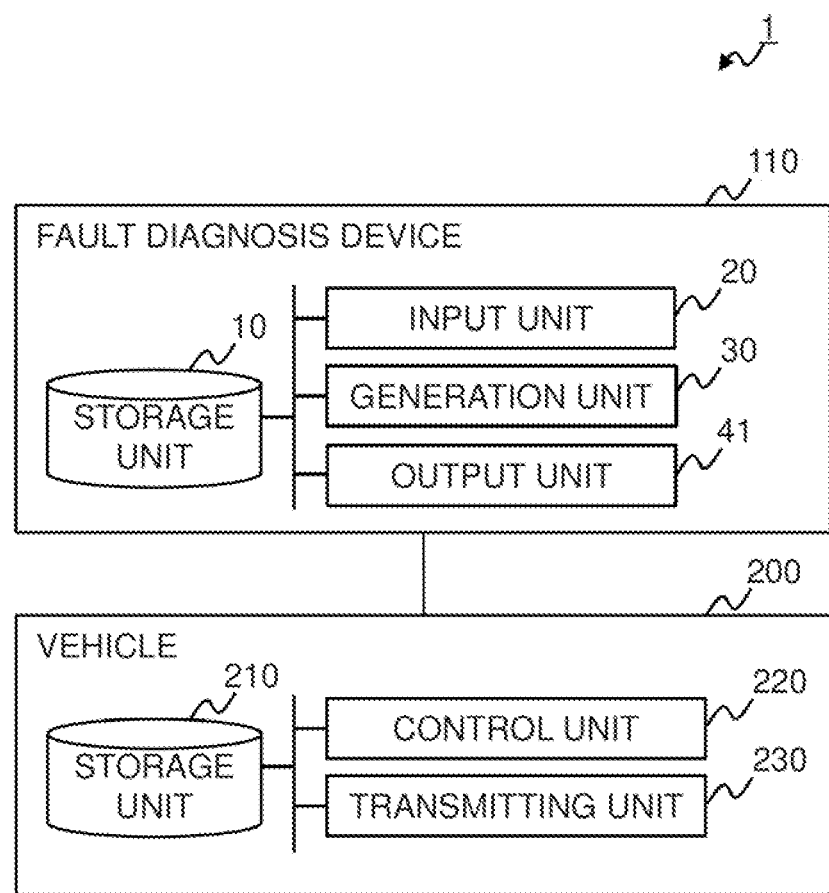
FIG. 3 It depicts a block diagram showing a configuration example of an exemplary embodiment of a fault diagnosis system according to the exemplary aspect of the present invention.

FIG. 3 is a block diagram showing a configuration example of an exemplary embodiment of a fault diagnosis system according to the exemplary aspect of the present invention. The fault diagnosis system 1 of this exemplary embodiment comprises a fault diagnosis device 110 and a vehicle 200.

The fault diagnostic device 110 and the vehicle 200 are interconnected via communication lines. In the example shown in FIG. 3, two vehicles 200 are described, but the number of vehicles 200 is not limited to two, and may be one or three or more.

The vehicle 200 includes a storage unit 210, a control unit 220, and a transmitting unit 230. A device including the storage unit 210, the control unit 220, and the transmitting unit 230 can be referred to as a vehicle control unit that controls the vehicle 200.

The storage unit 210 stores various information necessary for the vehicle 200 to perform a process. Specifically, the storage unit 210 stores observation data observed in the own vehicle and fault data output when a fault is detected. In addition, the storage unit 210 stores the feature master generated by the fault diagnostic system 110. The storage unit 210 is realized, for example, by a magnetic disk, an SD memory card, or the like.

The control unit 220 obtains observation data observed in the vehicle 200 and stores it in the storage unit 210. When a fault occurs in the vehicle 200, the control unit 220 detects the fault that has occurred in the vehicle and stores the fault data in the storage data 210.

The control unit 220 of this exemplary embodiment detects a sign of fault by determining the similarity between the features of the observation data included in the feature master and the features of the observation data obtained at any time in the own vehicle. Specifically, the control unit 220 may detect a sign of fault by constantly comparing the observed data observed at any time while the vehicle is in operation with the feature master. The method by which the control unit 220 extracts the features of the observation data is the same as the method by which the generation unit 30 extracts the features of the observation data.

Figure 4:
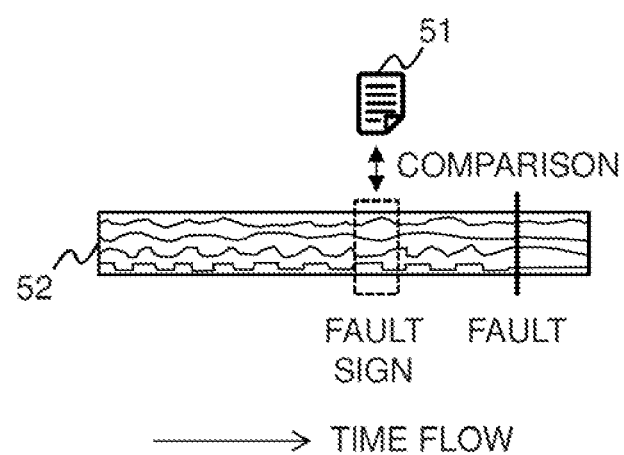
FIG. 4 It depicts an explanatory diagram showing an example of a process for detecting a sign of a fault.

FIG. 4 is an explanatory diagram showing an example of a process for detecting a sign of a fault. The control unit 220 may compare the pattern of the feature master 51 generated in advance with the CAN data 52 which is the observation data, if they match (or have a certain degree of similarity), it may be determined that there is a sign of a fault. At that time, the control unit 220 may output some alert to a display device (not shown).

The control unit 220 may determine the similarity of time series data sets using, for example, the method described in non-patent literature 1.

Although FIG. 4 illustrates the case where the feature master is one, the feature master to be compared by the control unit 220 is not limited to one. Since the feature master is generated for each type of fault, the control unit 220 may compare the observation data with each feature master generated for each type of fault.

The transmitting unit 230 transmits the obtained fault data and observation data to the fault diagnostic device 110. The fault data and the observation data stored in the storage unit 210 may be manually input to the fault diagnostic device 110.

The fault diagnostic device 110 comprises the storage unit 10, the input unit 20, the generation unit 30, and the output unit 41. In other words, the fault diagnosis device 110 of this exemplary embodiment has the same configuration as the fault diagnosis device 100 of the first exemplary embodiment. However, the output unit 41 of this exemplary embodiment, compared to the output unit 40 of the first exemplary embodiment, has an additional function of transmitting a feature master to the vehicle 200.

The output 41 transmits the generated feature master to the vehicle 200. At this time, the output unit 41 may transmit the generated feature master to other vehicles other than the vehicle that failed. In this way, by transmitting the feature master to vehicles 200 other than the vehicle from which the fault data was collected, it is possible to detect a sign of fault in the other vehicle 200 in which the fault has not occurred.

If the generation unit 30 generates feature masters for each type of vehicle, the output 41 may transmit the corresponding feature master for the same type of vehicle. Since a sign of fault is likely to be similar to vehicles of the same type, this makes it possible to improve the accuracy of detecting the sign of fault.

The control unit 220 and the transmitting unit 230 are realized by a processor of a computer that operates according to a program (control program). The input unit 20, the generation unit 30, and the output unit 41 realized by a processor of a computer that operates according to a program (fault diagnosis program).

Figure 5:
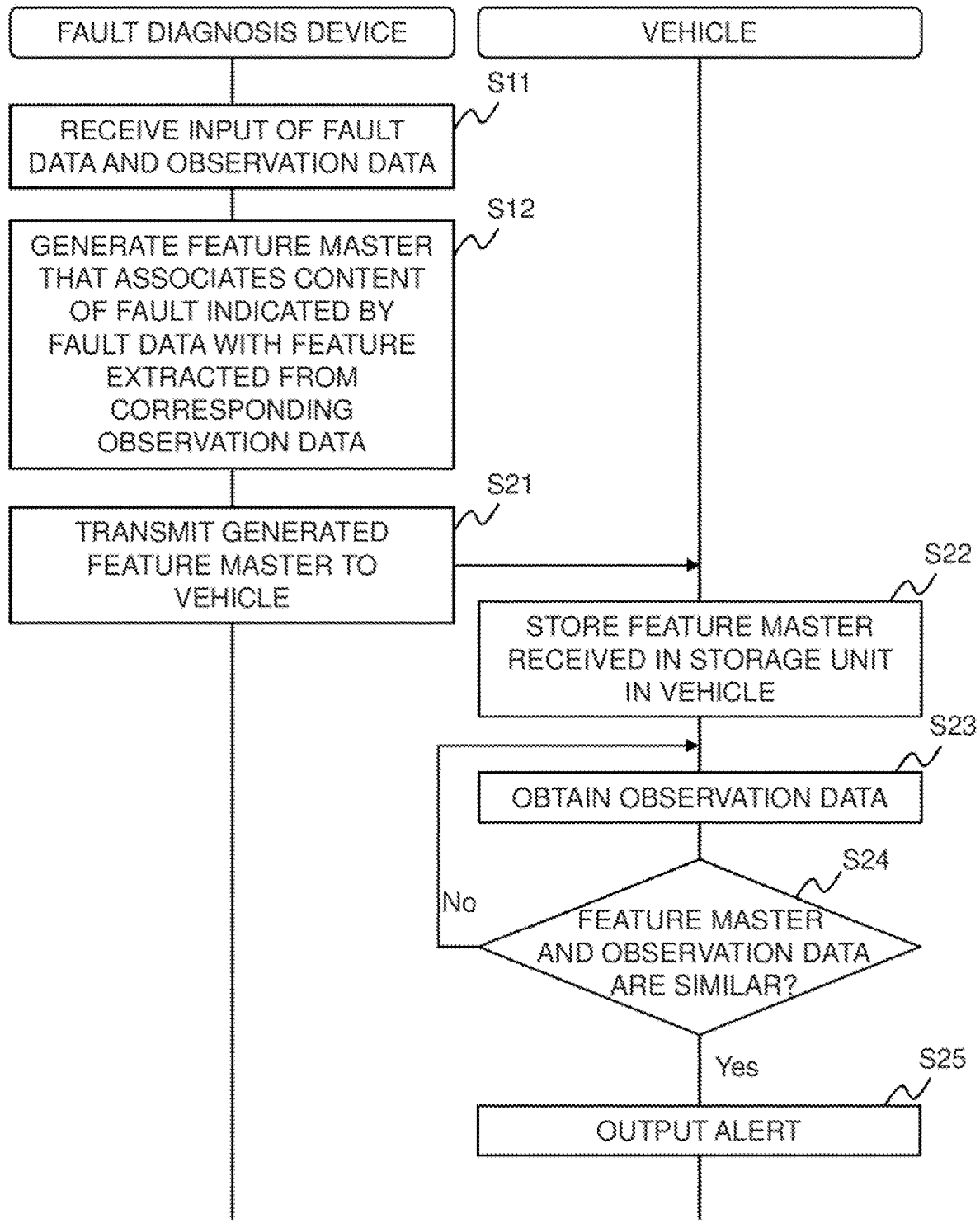
FIG. 5 It depicts a flowchart showing an operation example of a fault diagnosis system.

Next, the operation example of this exemplary embodiment will be described. FIG. 5 is a flowchart showing an operation example of the fault diagnosis system 1 of this exemplary embodiment. The process up to the fault diagnosis system 110 generates a feature master is the same as the processes from step S11 to step S12. The output unit 41 transmits the generated feature master to the vehicle 200 (step S21).

The control unit 220 of the vehicle 200 stores the feature master received from the fault diagnosis device 110 in the storage unit 210 in the vehicle 200 (step S22). The control unit 220 also obtains observation data in the own vehicle at any time (step S23), and determines the similarity between the features of the observation data included in the feature master and the features of the obtained observation data (step S24). If both are determined to be similar (Yes in step S24), the control unit 220 outputs an alert indicating that a sign of fault has been detected (step S25). On the other hand, if it is determined that the two are not similar (No in step S24), then the processing after step S23 for obtaining the observation data is repeated.

As described above, in addition to the configuration of the first exemplary embodiment, in this exemplary embodiment, the output unit 41 transmits the generated feature master to the vehicle 200, and the control unit 220 of the vehicle 200 detects a sign of fault by determining the similarity between the features of the observation data included in the received feature master and the observation data obtained in the own vehicle. Therefore, in addition to the effect of the first exemplary embodiment, it is possible to determine a sign of vehicle fault in real time.

Figure 6:
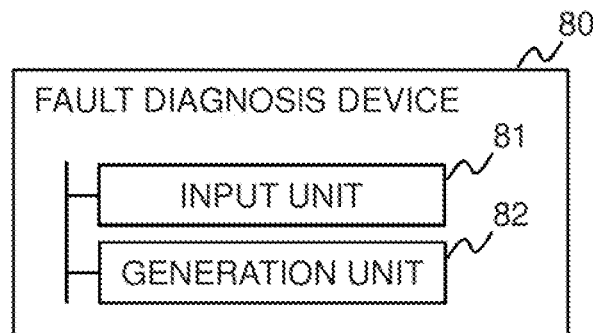
FIG. 6 It depicts a block diagram showing an overview of a fault diagnostic device according to the exemplary aspect of the present invention.

Next, an overview of the present invention will be described. FIG. 6 is a block diagram showing an overview of a fault diagnostic device according to the exemplary aspect of the present invention. The fault diagnostic device 80 (for example, appearance inspection device 100) according to the exemplary aspect of the present invention comprises an input unit 81 (for example, the input unit 20) which receives input of fault data (for example, a DTC) obtained from a vehicle when a fault of the vehicle occurs and observation data (for example, an engine RPM and speed, a battery status, a water temperature, etc.) observed in time series by each device (for example, an engine, a water temperature sensor, a battery) of the vehicle until immediately before the fault occurs and a generation unit 82 (for example, the generation unit 30) which generates a feature master that associates a content of the fault indicated by the fault data with features extracted from the corresponding observation data.

With such a configuration, it is possible to generate information for diagnosing a sign of a fault from collected vehicle fault data.

The generation unit 82 may divide the observation data of a time series into multiple segments to generate observation data of a partial time series, and extract the features of the observation data for each segment to generate the feature master.

Specifically, the input unit 81 may receive the input of a DTC indicating the fault data and communication data specified by a CAN protocol indicating the observation data or data obtained by an OBD.

Figure 7:
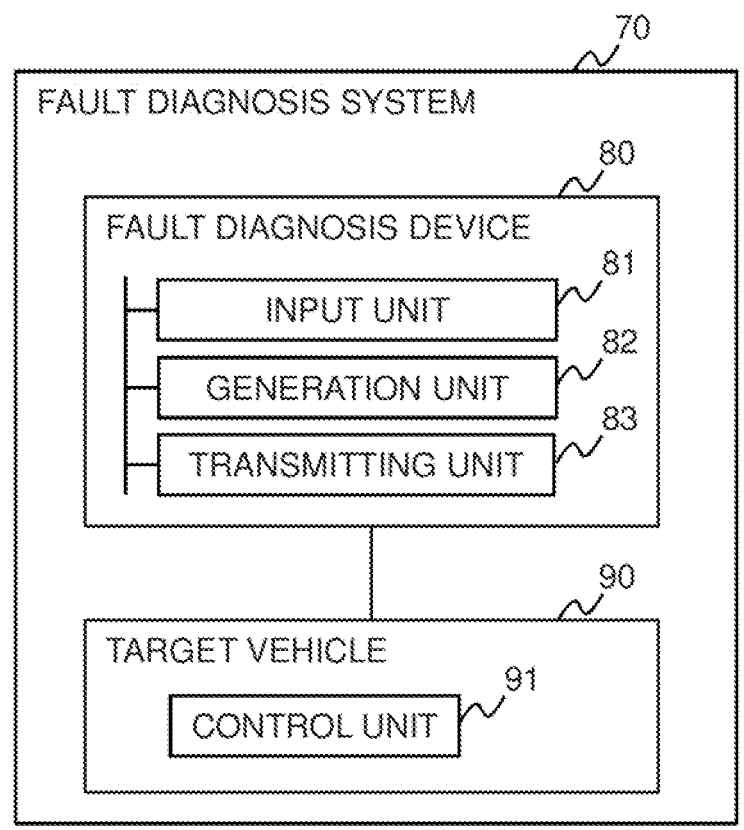
FIG. 7 It depicts a block diagram showing an overview of a fault diagnosis system according to the exemplary aspect of the present invention.

FIG. 7 is a block diagram showing an overview of a fault diagnosis system according to the exemplary aspect of the present invention. The fault diagnosis system 70 (for example, the fault diagnosis system 1) according to the exemplary aspect of the present invention comprises the fault diagnosis device 80 described above and a target vehicle 90 (for example, the vehicle 200) which receives information from the fault diagnostic device 80.

The fault diagnosis device 80 further includes a transmitting unit 83 (for example, the output unit 41) which transmits the generated feature master to the target vehicle 90. The target vehicle 90 includes a control unit 91 (for example, the control unit 220) which detects a sign of fault indicated by the corresponding fault data by determining the similarity between the features of the observation data included in the received feature master and the observation data obtained at any time in the own target vehicle.

Even with such a configuration, it is possible to generate information for diagnosing a sign of a fault from collected vehicle fault data and determine a sign of vehicle fault in real time The generation unit 82 may generate the feature master for each type of vehicle, and the transmitting unit 83 may transmits the corresponding feature master for the same type of target vehicle. As a result, it is possible to improve the accuracy of detecting a sign of fault.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST

1 Fault diagnosis system
10 Storage unit
20 Input unit
30 Generation unit
40, 41 Output unit
100, 110 Fault diagnosis device
200 Vehicle
210 Storage unit
220 Control unit
230 Transmitting unit

What is claimed is:

1. A fault diagnosis device comprising:
a memory storing instructions; and
one or more processors configured to execute the instructions to:
  receive input of fault data and observation data, the fault data being obtained from a vehicle when a fault of the vehicle occurs and the observation data being observed in time series by a device of the vehicle until immediately before the fault occurs;
  generate feature master data that associates a content of the fault with features, the content of the fault being indicated by the fault data and the features being extracted from the corresponding observation data; and
  transmit the generated feature master data to a target vehicle,
  wherein the generated feature master data is configured to equip the target vehicle to detect a sign of a fault in the target vehicle using the feature master data and another observation data obtained from the target vehicle.

2. The fault diagnosis device according to claim 1, wherein the processor is further configured to execute instructions to:
  divide the observation data of a time series into multiple segments to generate observation data of a partial time series; and
  extract the features of the observation data for each segment to generate the feature master data.

3. The fault diagnosis device according to claim 1, wherein the processor is further configured to execute instructions to:
  receive the input of a diagnostic trouble code (DTC) as the fault data and communication data specified by a controller area network (CAN) protocol as the observation data or data obtained by an on-board diagnostics (OBD) as the observation data.

4. The fault diagnosis system according to claim 1, wherein the generated feature master data is configured to equip the target vehicle to determine a similarity between the features of the observation data included in the received feature master data and another observation data obtained from the target vehicle, and detect the sign of the fault indicated by the fault data corresponding to the observation data included in the received feature master data on the basis of the similarity.

5. The fault diagnosis device according to claim 1, wherein the processor is further configured to execute instructions to:
  generate respective feature master data for each one of a plurality of types of vehicles; and
  transmit one of the generated feature master data corresponding to one of the plurality of types of vehicles that is a same type as the target vehicle.

6. The fault diagnosis device according to claim 1, wherein the generated feature master data is configured to equip the target vehicle to determine a similarity between the features of the observation data included in the received feature master data and another observation data obtained from the target vehicle, and to detect the sign of the fault in the target vehicle on the basis of the similarity.

7. A non-transitory computer readable information recording medium storing a fault diagnosis program that, when executed by a processor, performs a method comprising:
  receiving input of fault data and observation data, the fault data being obtained from a vehicle when a fault of the vehicle occurs and the observation data being observed in time series by a device of the vehicle until immediately before the fault occurs;
  generating feature master data that associates a content of the fault with features, the content of the fault being indicated by the fault data and the features being extracted from the corresponding observation data; and
  transmitting the generated feature master data to a target vehicle,
  wherein the generated feature master data is configured to equip the target vehicle to detect a sign of a fault in the target vehicle using the feature master data and another observation data obtained from the target vehicle.

8. The non-transitory computer readable information recording medium according to claim 7, wherein the method further comprises:
  dividing the observation data of a time series into multiple segments to generate observation data of a partial time series; and
  extracting the features of the observation data for each segment to generate the feature master data.

9. The non-transitory computer readable information recording medium according to claim 7, wherein the method further comprises:
  receiving input of a diagnostic trouble code (DTC) as the fault data and communication data specified by a controller area network (CAN) protocol as the observation data or data obtained by an on-board diagnostics (OBD) as the observation data.

10. The non-transitory computer readable information recording medium according to claim 7, wherein the generated feature master data is configured to equip the target vehicle to determine a similarity between the features of the observation data included in the received feature master data and another observation data obtained from the target vehicle, and to detect the sign of the fault indicated by the fault data corresponding to the observation data included in the received feature master data on the basis of the similarity.

11. The non-transitory computer readable information recording medium according to claim 7, wherein the method further comprises:
generating respective feature master data for each one of a plurality of types of vehicles; and
transmitting one of the generated feature master data corresponding to one of the plurality of types of vehicles that is a same type as the target vehicle.

12. The non-transitory computer readable information recording medium according to claim 7, wherein the generated feature master data is configured to equip the target vehicle to determine a similarity between the features of the observation data included in the received feature master data and another observation data obtained from the target vehicle, and to detect the sign of the fault in the target vehicle on the basis of the similarity.

13. A vehicle configured to communicate to a fault diagnosis device, the vehicle comprising:
a controller configured to detect a sign of a fault in the vehicle using feature master data transmitted from the fault diagnosis device and observation data obtained from the vehicle,
wherein the feature master data associates a content of the fault indicated by the fault data being obtained from another vehicle when a fault of the another vehicle occurs and the features being extracted from another observation data observed in time series by a device of the another vehicle until immediately before the fault occurs.

* * * * *